Oct. 29, 1968   E. M. LAU   3,408,034
PINCH VALVE
Filed July 16, 1963   2 Sheets-Sheet 2
FIG.2
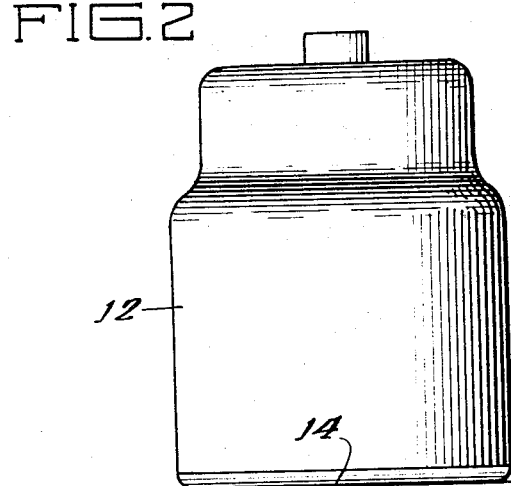
FIG.4
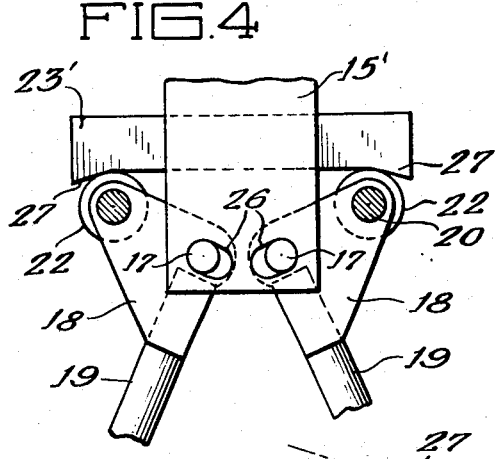
FIG.5
FIG.3
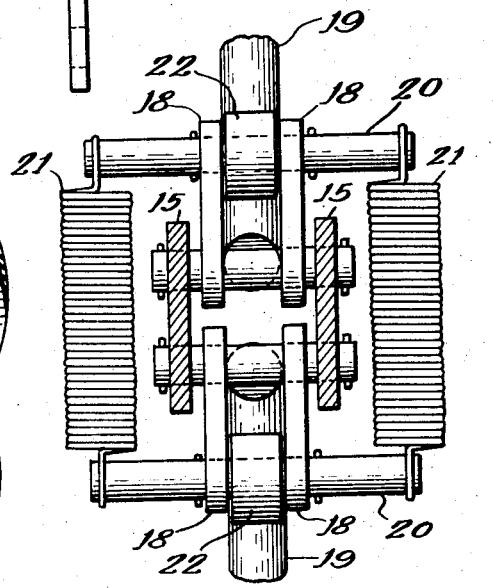
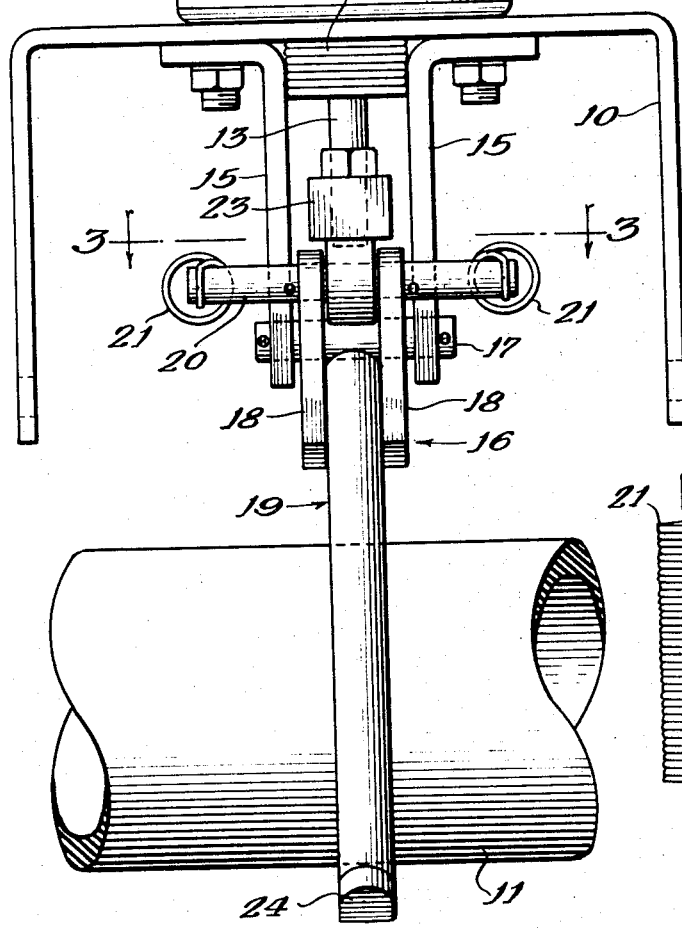
Inventor:
Erwin M. Lau
By: Zabel, Baker, Yoh,
Jones & Dithmar
Attorneys

United States Patent Office 3,408,034
Patented Oct. 29, 1968

3,408,034
PINCH VALVE
Erwin M. Lau, Dolton, Ill., assignor to Black Products Co., Chicago, Ill., a corporation of Illinois
Filed July 16, 1963, Ser. No. 295,478
6 Claims. (Cl. 251—9)

The present invention relates to an improved pinch valve for use in shutting off the flow of solid materials therethrough, such as granular, flaky or powdered material. The invention is of particular utility in a fluidizing type of bag filling machine, such as shown in my Patent No. 2,936,994 granted May 17, 1960.

The usual pinch valve as shown in the aforesaid application, comprises a rubber pinch-off sleeve which is disposed between two parallel rods, one being fixed, and the other being slidably mounted. A suitable air cylinder is provided for pushing the slidably mounted rod toward the fixed rod with sufficient force to pinch the pinch-off tube and cut off the flow of solid material therethrough.

The difficulty in this arrangement is that only the top half of the pinch-off tube is deformed and the geometry of the arrangement is such that the deformation is a type of stretching which considerably curtails the life of the pinch-off tube. In many instances, particularly where the pinch valve is used to cut off the flow of abrasive materials, the life of the pinch-off tube is only a month, and instances have been encountered where the pinch-off tube has to be replaced after only a day or two of use.

The above difficulties can be mitigated somewhat by elevating the fixed bar so as to reduce the amount of stretching to which the top half of the tube is subjected, but the problem here encountered is that any elevation of the fixed bar will put a hump in the pinch-off tube which reduces its cross-sectional area. When used as a cut-off valve for a fluidizing type of bag filling machine, any reduction in the cross-sectional area of the flexible pinch-off tube is undesirable because it reduces the rate of flow and hence slows up the bag filling operation materially.

It is an object of my invention to provide a quick acting, power actuated pinch valve which avoids the above difficulties.

According to my invention, I close the pinch-off tube by means of two pivotally mounted pinch rods so that each half of the tube will be deformed to a substantially equal extent, and in which the deformation does not result in any substantial stretching of the tube.

Furthermore, the pinching mechanism is actuated by an air cylinder, and the arrangement is such that the desired pinching force can be developed even though the piston of the cylinder moves through only a relatively small distance. In other words, according to my invention, I provide a low friction actuating means which includes a cross head on the piston which bears against rollers mounted on the pinch bars so as to develop a high degree of efficiency.

A further object is to provide pinching mechanism which cooperates with a high pressure short throw air cylinder to provide a relatively compact construction. According to this aspect of my invention, the parts are arranged in such a manner that the compact construction can be achieved without at the same time being subjected to unbalanced forces of large magnitude and large frictional forces which materially reduce the efficiency of the mechanism.

The present invention is characterized by the provision of pinching elements in the form of bell cranks, the upper portions of which are forked so as to be symmetrical with the axis of the piston rod, and the cross head and roller arrangement above mentioned permits the use of a relatively short lever arm without impairing mechanical efficiency.

Still another object is to provide a pinch valve in which the pinching mechanism can accommodate pinch-off tubes of varying diameters and wall thicknesses.

Other objects, features and advantages will become apparent as the description proceeds.

With reference now to the drawings in which like reference numerals designate like parts:

FIG. 2 is an end elevation of FIG. 1;

FIG. 3 is a plan section taken along line 3—3 of FIG. 2;

FIG. 4 is a fragmentary elevation showing a modification; and

FIG. 5 is a diagram showing the angular relationship of certain of the parts.

Figure 1:
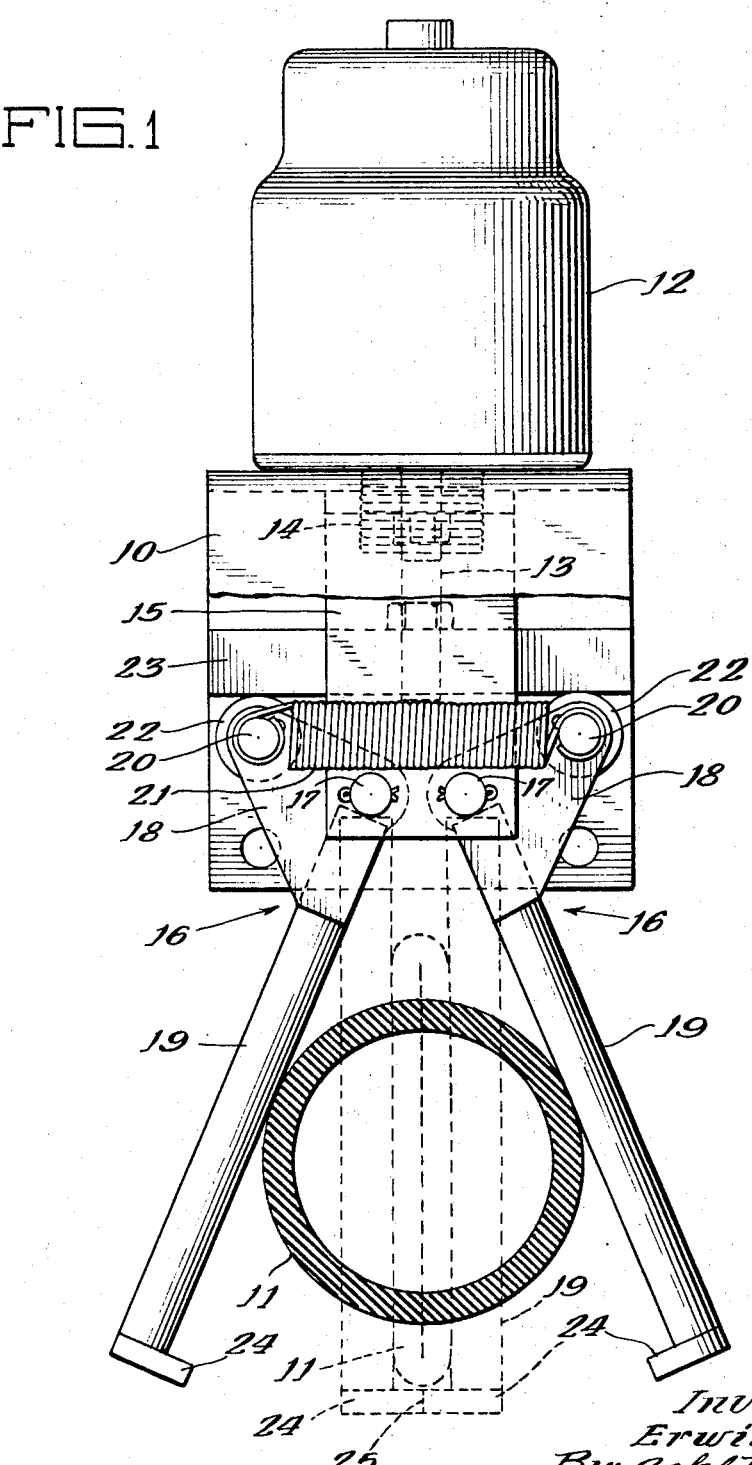
FIG. 1 is an elevation of a preferred embodiment of my invention, a portion of the mounting bridge being broken away, and a changed position of the parts being shown in broken lines.

As shown in FIG. 2 the pinch valve comprises a mounting bridge 10 located above a pinch-off tube 11. The pinch-off tube is formed of rubber or similar deformable material, and generally consists of an insert in a length of metallic pipe or conduit, being supported at its ends by the two sections of conduit to which it is attached. The environment includes suitable structural means upon which the bridge 10 is mounted.

An air cylinder 12 is mounted on the bridge 10, and includes a piston and piston rod 13. In the embodiment shown, the air cylinder and piston is preferably of a diaphragm type, as indicated by the bellows 14, this type of air cylinder being commonly used in the automotive trade for power braking and power steering.

A pair of brackets 15 depend from the bridge 10. Two bell cranks 16 are located between the bracket 15 in oppositely disposed relationship and are pivotally mounted thereon by pivot pins 17. The upper arm of each bell crank is forked and is shorter than the lower arm. As shown herein, the upper arm is in the form of a pair of spaced triangular plates 18 which embrace and are welded to a pinch rod 19, the pinch rod comprising the lower arm of the bell crank. The pivot pin 17 passes through triangular plates 18 at their inner ends. The outer ends are perforated to receive a cross pin 20, in each instance. The cross pins 20 are extended in either direction beyond the triangular plates 18, and tensioned coil springs 21 are hooked over the outer ends of the cross pins 20, thus biasing the pinch rods 19 into the open position, shown in FIG. 1.

Bearing rollers 22 are mounted on each cross pin 20 between the triangular plates 18.

A lower end of the piston 13 carries a cross head 23 which engages the bearing rollers 22.

In operation, when air or other fluid is introduced into the cylinder 12, the piston 13 will be extended downwardly, and the cross head 23 will be urged against the rollers 22, thus rocking the bell cranks 16 into the valve closed position shown in broken lines in FIG. 1.

The lower ends of the two pinch rods 19 are provided with feet 24 which limits their movement into valve closed position. The dimensions of the feet 24 correspond with the spacing between the centers of the pivot pins 17 so that the two pinch rods 19 are parallel when in valve closed position.

The spacing between the pinch rods, when parallel, is no greater than twice the wall thickness of the pinch-off tube 11 so as to effect complete closure of the valve.

In one embodiment of my invention, the pinch-off tube 11 has an outer diameter of 3¾ inches and an inner diameter of 3 inches, thus providing a wall thickness of ⅜ of an inch. The spacing between the pinch rods 19, when in closed position, is preferably 11/16 of an inch, slightly less than the combined wall thicknesses. In other words, the pinching mechanism actually compresses the wall of the pinch-off tube to a slight extent.

A particular feature of my invention is that the pinching mechanism will accommodate pinch-off tubes of varying diameters, provided that the wall thickness of the tube is substantially the same throughout a given size range.

For different size ranges, the mechanism is substantially identical, calling only for as light variation in the center spacing of the pivot pins 17 and a slight variation in the width of the feet 24 to accommodate a size range of tubes having a wall thickness of 5/16 inch or a size range having a wall thickness of 1/4 inch.

The required adjustment in the width of the feet 24 is accomplished by grinding off the edges of the two feet at the point 25 where they contact each other, the bell cranks 16 and feet 24 being made in a standard size to accommodate a maximum wall thickness.

Although the adjustment of the center spacing of the pivot pins would normally be accomplished by relocating same, it is possible to provide an automatic alignment of the pinch rods 19 so that they will be parallel with each other in closed position irrespective of the wall thickness, providing that the feet 24 are ground off as above indicated. This automatic alignment feature is shown in FIG. 4.

In FIG. 4 the brackets 15' are formed with elongate openings 26 therein, instead of the circular openings shown in FIG. 1. This provides a floating pivot which permits a lateral movement of the bell cranks 16 toward and away from each other so that there will be one position of the bell cranks in which the pinch rods 19 are parallel with each other.

The self-aligning movement of the bell cranks is accomplished by sloping the undersurface of the cross head 23' to provide cam surfaces 27. As shown in FIG. 5, the angular disposition of the cam surfaces 27 is such that they form an angle of slightly more than 90° with respect to a radius 28 emanating from the contact point 25 as a center. Thus, as the cross head 23' moves downwardly into its final position, the contact point 25 serves as a reaction point which results in an inwardly camming movement which aligns the pinch rods 19 in parallelism with each other. Just prior to that time, the pinch off tube 11 provides the reaction point which results in an outwardly camming movement to the extent permitted by the elongate openings 26 as shown in FIG. 4.

Thus, the floating pivot construction permits the use of a standard pinching mechanism for various size ranges of pinch off tubes, subject only to a grinding off of the foot members 24 where the wall thickness calls for such modification.

When the proper relationship between spacing and wall thickness is observed, as outlined above, it is possible to provide a pinch valve in which the life of the pinch-off tube, even with abrasive materials, is many times the life of the pinch-off tube in a parallel rod type of pinch valve as previously described. This is in spite of the fact that a relatively high pinching force can be employed in order to provide complete closing and exceedingly rapid actuation.

In a preferred embodiment of my invention, an air pressure of 80 pounds per square inch was supplied to an air cylinder 12 in which the effective piston diameter was two inches, and in which the lever arm proportions were substantially as shown in FIG. 1. This arrangement developed a pinching force of about 80 pounds, in spite of the compact arrangement which permitted a piston throw of less than half an inch.

Although only preferred embodiments of my invention are shown and described herein, it will be understood that modifications and changes may be made in the constructions shown without departing from the spirit of my invention as pointed out in the appended claims.

I claim:

1. Pinching mechanism for a pinch valve comprising a pair of oppositely disposed bell cranks each having an upper arm and a lower arm, floating pivot means for mounting said bell cranks for limited movement toward and away from each other, a roller carried by the upper arm of each bell crank, cross head means engaging said rollers to urge said lower arms toward each other, and foot members carried at the lower ends of said lower arms for engagement with each other to limit the extent of movement of said lower arms toward each other, said cross head means including inwardly and downwardly facing inclined oppositely disposed cam surfaces for engaging said rollers, said inwardly facing inclination being with respect to each other.

2. Pinching mechanism as claimed in claim 1 in which the disposition of said cam surfaces is such that the inwardly facing angle formed by each cam surface and a radius line drawn from the contacting edges of said foot members when in closed position is greater than 90°.

3. A pinch valve comprising a pinch-off tube, pinching mechanism therefor, and a fluid actuated power cylinder for actuating said pinching mechanism, said pinching mechanism comprising support means mounted above said pinch-off tube, said power cylinder being mounted on said support means and having a piston rod extending downwardly through said support means, oppositely disposed brackets extending downwardly from said support means on opposite sides of said piston rod, a pair of oppositely disposed bell cranks pivotally mounted on said brackets and disposed therebetween and each having an upper arm and a lower arm, a cross head on said piston rod engaging said upper arms, the lower arms of said bell cranks being downwardly diverging with respect to the axis of said piston rod, and said pinch-off tube being located between said diverging lower arms in a substantially centered position, whereby operation of said power cylinder will cause rotation of said bell cranks and movement of said lower arms toward each other and into engagement with said pinch-off tube to pinch the same into collapsed position, each upper arm comprising a pair of spaced plates, a pivot pin extending through said brackets and said plates, a cross pin extending through each pair of said plates at the outer arm portion thereof, a roller mounted on said cross pin between said plates for engagement by said cross head, the ends of said cross pins being extended beyond said plates, and a coil spring tensioned between the extended ends of said cross pins for biasing said bell cranks into the open position.

4. A pinch valve as claimed in claim 3 in which said lower arms extend beyond said pinch-off tube when the latter is in its collapsed position, and foot members on the lower ends of said arms to limit the extent of movement of said lower arms toward each other.

5. A pinch valve as claimed in claim 4 in which the center spacing of said pivot pins corresponds to the spacing provided by said foot members so that said lower arms are substantially parallel with each other when in closed position, the distance between said parallel lower arms being not greater than twice the wall thickness of said pinch-off tube in the closed position.

6. A pinch valve comprising a pinch-off tube, pinching mechanism therefor, and a fluid actuated power cylinder for actuating said pinching mechanism, said pinching mechanism comprising support means mounted above said pinch-off tube, said power cylinder being mounted on said support means and having a piston rod extending downwardly through said support means, oppositely disposed brackets extending downwardly from said support means on opposite sides of said piston rod, a pair of oppositely disposed bell cranks pivotally mounted on said brackets and disposed therebetween and each having an upper arm and a lower arm, said upper arms being disposed at an angle to said lower arms such that the outer ends of said upper arms have a freedom of movement in the same general direction as the movement of said piston rod, a cross head on said piston rod engaging said upper arms, the lower arms of said bell cranks being downwardly diverging with respect to the axis of said piston rod, and said pinch-off tube being located between said diverging lower arms in a substantially centered position, whereby operation of said power cylinder will cause rotation of said bell cranks and movement of said lower arms toward each other and into engagement with said pinch-off tube to pinch the same into collapsed position, elongate openings formed in each of said brackets, a pivot pin carried by each of said bell cranks and extending through said elongate openings to permit inward movement of said bell cranks toward each other, and inwardly and downwardly facing cam surfaces formed on the underside of said cross head for engaging said upper arms, said inwardly facing disposition being with respect to the axis of said piston rod.

References Cited

UNITED STATES PATENTS

| | | | |
|---|---|---|---|
| 492,931 | 3/1893 | Baird | 269—34 X |
| 770,270 | 9/1904 | Dehn | 269—34 X |
| 2,890,855 | 6/1959 | Little | 251—5 |
| 2,936,994 | 5/1960 | Lau | 251—7 X |
| 3,117,904 | 1/1964 | Black | 251—7 X |

FOREIGN PATENTS

| | | |
|---|---|---|
| 301,087 | 9/1932 | Italy. |
| 254,906 | 1/1949 | Switzerland. |
| 1,038,850 | 9/1958 | Germany. |

WILLIAM F. O'DEA, *Primary Examiner.*

R. GERARD, *Assistant Examiner.*